(12) United States Patent
Mahan

(10) Patent No.: US 11,364,777 B2
(45) Date of Patent: Jun. 21, 2022

(54) MULTI-SECTIONAL SUN VISOR FOR A VEHICLE

(71) Applicant: Pamela Mahan, Lubbock, TX (US)

(72) Inventor: Pamela Mahan, Lubbock, TX (US)

( * ) Notice: Subject to any disclaimer, the term of this patent is extended or adjusted under 35 U.S.C. 154(b) by 0 days.

(21) Appl. No.: 17/074,772

(22) Filed: Oct. 20, 2020

(65) Prior Publication Data

US 2022/0118828 A1    Apr. 21, 2022

(51) Int. Cl.
*B60J 3/02*    (2006.01)

(52) U.S. Cl.
CPC ............. *B60J 3/0278* (2013.01); *B60J 3/026* (2013.01); *B60J 3/0239* (2013.01)

(58) Field of Classification Search
CPC ......... B60J 3/0278; B60J 3/0239; B60J 3/026
USPC ..................................... 296/97.8, 97.11, 97.2
See application file for complete search history.

(56) References Cited

U.S. PATENT DOCUMENTS

| | | | | |
|---|---|---|---|---|
| 8,708,395 B1* | 4/2014 | Kim | ........................ | B60J 3/0208 296/97.5 |
| 9,321,330 B2* | 4/2016 | Richman | ................ | B60J 3/0208 |
| 9,493,055 B1* | 11/2016 | Murat | .................... | B60J 3/0208 |
| 10,532,635 B2* | 1/2020 | Mueller | ................ | B60J 3/0256 |
| 2019/0124741 A1* | 4/2019 | Dickie | .................. | H05B 47/11 |
| 2019/0322162 A1* | 10/2019 | Murase | ................. | G02F 1/1533 |

* cited by examiner

*Primary Examiner* — Joseph D. Pape
(74) *Attorney, Agent, or Firm* — The Iwashko Law Firm, PLLC; Lev Ivan Gabriel Iwashko

(57) ABSTRACT

A multi-sectional sun visor disposed on at least a portion of a vehicle, including a first section comprising a first body disposed over a front windshield of the vehicle to prevent external light from passing therethrough, and a second section, including a second body to prevent the external light from passing therethrough, and a pivoting arm hingedly disposed at a first end within at least a portion of the second body and connected at a second end to the first body to rotate in a first direction toward the first body, and in a second direction at least partially away from the first body, such that the second body is at least partially disposed over a side window of the vehicle in the second position.

6 Claims, 1 Drawing Sheet

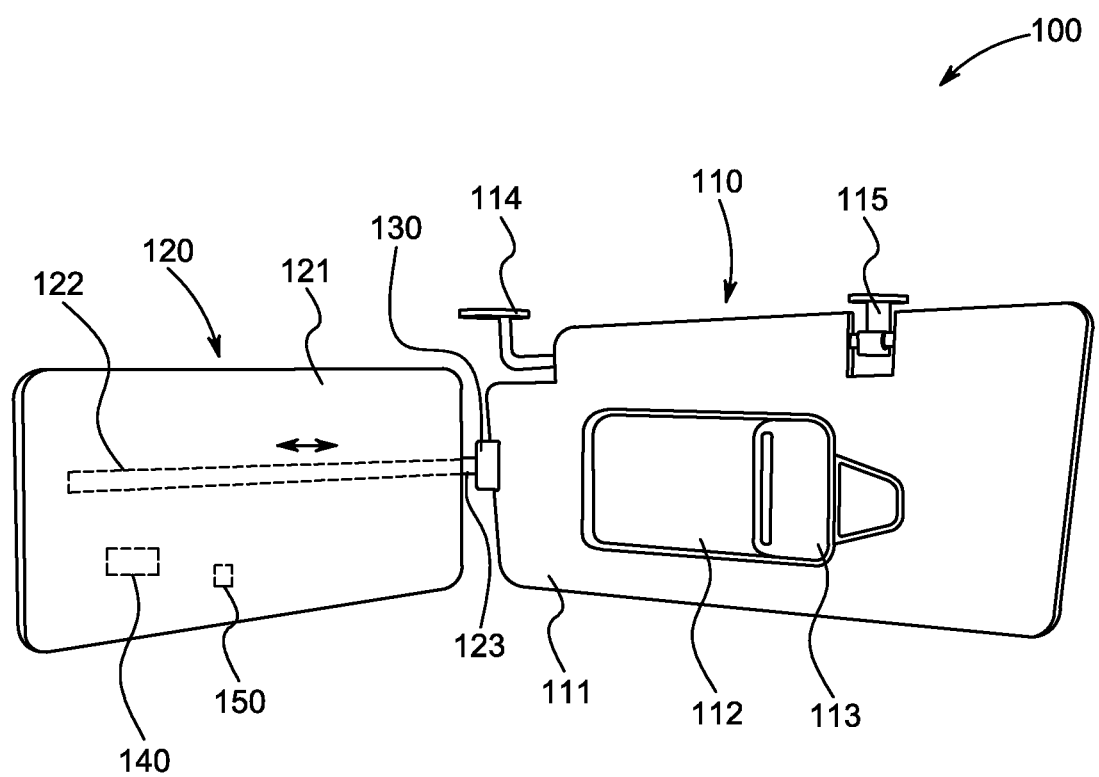

MULTI-SECTIONAL SUN VISOR FOR A VEHICLE

BACKGROUND

1. Field

The present general inventive concept relates generally to a sun visor, and particularly, to a multi-sectional sun visor for a vehicle.

2. Description of the Related Art

Many vehicles include a sun visor to keep the sun out of a driver's eyes when operating a vehicle. However, the sun visor is not always efficient because bright light, such as from the Sun can enter a vehicle through front windows and side windows of an automobile. The bright light often causes limited and/or blurry vision, as well as distracting the driver from focusing on the road. These problems either individually or in combination can cause potentially dangerous driving conditions.

Unfortunately, the sun visor is limited to covering the bright light from the front window or the side window, but not both. Specifically, the sun visor is usually rotated by the driver to prevent the bright light from one window.

Therefore, there is a need for a multi-sectional sun visor that covers more than one window.

SUMMARY

The present general inventive concept provides a multi-sectional sun visor for a vehicle.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a multi-sectional sun visor disposed on at least a portion of a vehicle, the multi-sectional sun visor including a first section comprising a first body disposed over a front windshield of the vehicle to prevent external light from passing therethrough, and a second section, including a second body to prevent the external light from passing therethrough, and a pivoting arm hingedly disposed at a first end within at least a portion of the second body and connected at a second end to the first body to rotate in a first direction toward the first body, and in a second direction at least partially away from the first body, such that the second body is at least partially disposed over a side window of the vehicle in the second position.

The second body may slide along the pivoting arm in a first lateral direction toward the first body, and slides along the pivoting arm in a second lateral direction away from the first body.

The multi-sectional sun visor may further include a fastener removably disposed on at least a portion of the first body to connect the pivoting arm to the first body.

The multi-sectional sun visor may further include a light sensor disposed within at least a portion of the second body to detect a light level.

The second body may adjust a transparency level thereof in response to the light level exceeding a predetermined light level.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a rear perspective view of a multi-sectional sun visor, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the FIGURES, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Multi-Sectional Sun Visor 100
First Section 110

First Body 111
Mirror 112
Sliding Door 113
Connecting Rod 114
Detachable Portion 115
Second Section 120
Second Body 121
Pivoting Arm 122
Hinge 123
Fastener 130
Light Sensor 140
Power Source 150

FIG. 1 illustrates a rear perspective view of a multi-sectional sun visor 100, according to an exemplary embodiment of the present general inventive concept.

The multi-sectional sun visor 100 may be constructed from at least one of plastic, metal, wood, glass, and rubber, etc., but is not limited thereto.

The multi-sectional sun visor 100 may include a first section 110, a second section 120, a fastener 130, a light sensor 140, and a power source 150, but is not limited thereto.

Referring to FIG. 1, the first section 110 and/or the second section 120 is illustrated to have a rectangular prism shape. However, the first section 110 and/or the second section 120 may be rectangular, circular, conical, triangular, pentagonal, hexagonal, heptagonal, octagonal, or any other shape known to one of ordinary skill in the art, but is not limited thereto.

The first section 110 may include a first body 111, a mirror 112, a sliding door 113, a connecting rod 114, and a detachable portion 115, but is not limited thereto.

The first body 111 may have a predetermined size to prevent external light (e.g., sun light, ultraviolet (UV) light, headlights, etc.) from passing therethrough. Specifically, the first body 111 may block the external light from reaching eyes of a user within a vehicle.

The first body 111 may be opaque, transparent, and/or a combination thereof. Additionally, the first body 111 may constructed of an electrochromic material, such that a transparency level may adjust based on a voltage level applied thereto.

The mirror 112 may be disposed on and/or within at least a portion of the first body 111. The mirror 112 may reflect at least one image therefrom.

The sliding door 113 may be movably (i.e. slidably) disposed on and/or within at least a portion of the first body 111, such that the sliding door 113 may cover and/or expose the mirror 112. Also, the sliding door 113 may move from closed in a first position to at least partially opened in a second position. Conversely, the sliding door 113 may move from opened in the second position to closed in the first position.

The connecting rod 114 may be disposed within at least a portion of an interior of the vehicle. For example, the connecting rod 114 may connect the first body 111 to a roof of the vehicle, such that the first body 111 may be disposed over a front windshield in front of a driver and/or a front seat passenger.

The detachable portion 115 may be detachably connected to the roof of the vehicle. More specifically, the detachable portion 115 may detachably connect (i.e. snap, hook) to the roof of the vehicle, such that the first body 111 may pivot and/or rotate in a lateral direction and/or a vertical direction on the connecting rod 114 with respect to the roof. In other words, the detachable portion 115 may allow the first body 111 to be in a fixed position and/or moved based on a preference of the user.

The second section 120 may include a second body 121, a pivoting arm 122, and a hinge 123, but is not limited thereto.

Referring again to FIG. 1, the second body 121 may have a predetermined size to prevent the external light from passing therethrough. Specifically, the second body 111 may block the external light from reaching the eyes of the user within the vehicle. Also, the second body 121 may have a length equivalent to a length of the first body 111 and a width less than a width of the first body 111.

The second body 121 may be opaque, transparent, and/or a combination thereof. Additionally, the second body 121 may constructed of the electrochromic material similar to the first body 111, such that a transparency level may adjust based on a voltage level applied thereto.

The pivoting arm 122 may be disposed at a first end within at least a portion of the second body 121. Also, the pivoting arm 122 may be removably connected at a second end to at least a portion of the first body 111. Moreover, the second body 121 may move (i.e. slide) in a first lateral direction or a second lateral direction with respect to the pivoting arm 122 away from the first body 111, and in the second lateral direction or the first lateral direction with respect to the pivoting arm 122 toward the first body 111. In other words, the second body 121 may extend away from the first body 111 and/or move closer to the first body 111 based on the preference of the user.

Furthermore, the pivoting arm 122 may be pivotally disposed on the hinge 123. As such, the second body 121 may rotate in a first direction toward the first body 111, and rotate at least partially in a second direction away from the first body 111, such that the second body 121 may be positioned at any fixed position with respect to the first body 111, such that the second body 121 may be at least partially disposed over a side window of the vehicle. For example, the second body 121 may rotate and be positioned at ninety degrees with respect to the first body 111.

As such, the second body 121 may be adjusted to prevent the external light from reaching the eyes of the user, such as from the side window of the vehicle for the driver and/or the front seat passenger.

The fastener 130 may include an adhesive (e.g., tape, glue, etc.), a screw, a nail, a bolt, a twine, a string, a magnet, and a rope, but is not limited thereto.

The fastener 130 may be removably disposed on at least a portion of the first body 111. The fastener 130 may receive the second end of the pivoting arm 122 thereon, such that the pivoting arm 122 may be removably connected to the first body 111.

The light sensor 140 may be disposed on and/or within at least a portion of the second body 121. Also, another light sensor 140 may be disposed on and/or within at least a portion of the first body 111. The light sensor 140 may detect a light level to compare to a predetermined light level. Moreover, the second body 121 and/or the first body 111 may adjust a transparency level thereof, due to the electrochromic material, in response to an increase in the light level exceeding the predetermined light level. Additionally, the second body and/or the first body 111 may decrease the transparency level of the first body 111 and/or the second body 112 in response to the increase in the light level. In other words, the second body 121 and/or the first body 111 may reduce transparency due to receiving increasing amounts of the external light, such as increasing amounts of sunlight. In other words, less transparency may reduce the amount of external light moving through the first body 111 and/or the second body 121. As such, the second body 121 and/or the first body 111 may adjust the transparency level to prevent the external light from reaching the eyes of the user.

The power source 150 may include a battery and a solar cell, but is not limited thereto.

The power source 150 may send power to the first body 111, the second body 112, and/or the light sensor 140.

Therefore, the multi-sectional sun visor 100 may cover at least a portion of the front windshield and/or the side window. As such, the multi-sectional sun visor 100 may prevent the external light from interfering with vision of the user.

The present general inventive concept may include a multi-sectional sun visor 100 disposed on at least a portion of a vehicle, the multi-sectional sun visor including a first section 110 comprising a first body 111 disposed over a front windshield of the vehicle to prevent external light from passing therethrough, and a second section 120, including a second body 121 to prevent the external light from passing therethrough, and a pivoting arm 122 hingedly disposed at a first end within at least a portion of the second body 121 and connected at a second end to the first body 111 to rotate in a first direction toward the first body 111, and in a second direction at least partially away from the first body 111, such that the second body 121 is at least partially disposed over a side window of the vehicle in the second position.

The second body 121 may slide along the pivoting arm 122 in a first lateral direction toward the first body 111, and slides along the pivoting arm 122 in a second lateral direction away from the first body 111.

The multi-sectional sun visor 100 may further include a fastener 130 removably disposed on at least a portion of the first body 111 to connect the pivoting arm 122 to the first body 111.

The multi-sectional sun visor 100 may further include a light sensor 140 disposed within at least a portion of the second body 121 to detect a light level.

The second body 121 may adjust a transparency level thereof in response to the light level exceeding a predetermined light level.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A multi-sectional sun visor disposed on at least a portion of a vehicle, the multi-sectional sun visor comprising:
    a first section comprising a first body disposed over a front windshield of the vehicle to prevent external light from passing therethrough; and
    a second section, comprising:
        a second body to prevent the external light from passing therethrough, and
        a pivoting arm hingedly disposed at a first end within at least a portion of the second body and connected at a second end to a center portion of the first body to rotate in a first direction toward the first body, and in a second direction at least partially away from the first body, such that the second body is at least partially disposed over a side window of the vehicle in the second position, such that the pivoting arm rotates with respect to the center portion of the first body, such that the pivoting arm is disposed within the second body different from the connection of the pivoting arm to the first body.

2. The multi-sectional sun visor of claim 1, wherein the second body slides along the pivoting arm in a first lateral direction toward the first body, and slides along the pivoting arm in a second lateral direction away from the first body.

3. The multi-sectional sun visor of claim 1, further comprising:
    a fastener removably disposed on at least a portion of the first body to connect the pivoting arm to the first body.

4. The multi-sectional sun visor of claim 1, further comprising:
    a light sensor disposed within at least a portion of the second body to detect a light level.

5. The multi-sectional sun visor of claim 4, wherein the second body adjusts a transparency level thereof in response to the light level exceeding a predetermined light level.

6. A multi-sectional sun visor disposed on at least a portion of a vehicle, the multi-sectional sun visor comprising:
    a first section, comprising:
        a first body disposed over a front windshield of the vehicle to prevent external light from passing therethrough,
        a connecting rod disposed within at least a portion of the first body to connect the first body to a roof of the vehicle, and
        a detachable portion disposed within at least a portion of the first body and extending a distance away from a top edge of the first body to detachably connect to the roof of the vehicle; and
    a second section, comprising:
        a second body to prevent the external light from passing therethrough, and
        a pivoting arm hingedly disposed at a first end within at least a portion of the second body and connected at a second end to the first body to rotate in a first direction toward the first body, and in a second direction at least partially away from the first body, such that the second body is at least partially disposed over a side window of the vehicle in the second position.

* * * * *